(12) United States Patent
Khattak

(10) Patent No.: US 12,341,761 B2
(45) Date of Patent: Jun. 24, 2025

(54) PROXIMITY-BASED COMMUNICATION SYSTEMS AND METHODS

(71) Applicant: Zohaib Khan Khattak, San Antonio, TX (US)

(72) Inventor: Zohaib Khan Khattak, San Antonio, TX (US)

( * ) Notice: Subject to any disclaimer, the term of this patent is extended or adjusted under 35 U.S.C. 154(b) by 447 days.

(21) Appl. No.: 17/975,317

(22) Filed: Oct. 27, 2022

(65) Prior Publication Data

US 2024/0146704 A1    May 2, 2024

(51) Int. Cl.
    *H04L 9/40*      (2022.01)
    *H04W 12/63*     (2021.01)

(52) U.S. Cl.
    CPC ........ *H04L 63/0492* (2013.01); *H04L 63/107* (2013.01); *H04W 12/63* (2021.01)

(58) Field of Classification Search
    CPC ................. H04L 63/0492; H04L 63/107
    USPC .......................................... 455/411
    See application file for complete search history.

(56) References Cited

U.S. PATENT DOCUMENTS

| | | |
|---|---|---|
| 7,478,755 B2 | 1/2009 | Sekiguchi |
| 8,430,302 B2 | 4/2013 | Minnick et al. |
| 8,511,540 B2 | 8/2013 | Anguiano |
| 8,532,302 B2 | 9/2013 | Maity |
| 8,732,311 B1 | 5/2014 | Lam et al. |
| 8,886,172 B2 | 11/2014 | Gomez |
| 8,963,984 B2 | 2/2015 | Brady et al. |
| 8,997,213 B2 | 3/2015 | Papakipos et al. |
| 9,082,052 B2 | 7/2015 | Rodriguez et al. |
| 9,084,092 B2 | 7/2015 | Liang |
| 9,092,830 B2 | 7/2015 | Gomez et al. |
| 9,143,944 B2 | 9/2015 | Gong et al. |
| 9,288,194 B2 | 3/2016 | Zhang |
| 9,456,292 B2 | 9/2016 | Tanji |

(Continued)

FOREIGN PATENT DOCUMENTS

| | | |
|---|---|---|
| EP | 0905953 A2 | 3/1999 |
| EP | 2947842 A1 | 11/2015 |

(Continued)

*Primary Examiner* — Ted M Wang
(74) *Attorney, Agent, or Firm* — Outlier Patent Attorneys, PLLC

(57) ABSTRACT

Disclosed herein are systems and methods for enabling communications between devices. An example method may comprise receiving, from a second computing device, an incoming communication request to connect to a first computing device that is associated with a first point of communication code and a first user profile. The example method may comprise decrypting the received request associated with the incoming communication. The example method may comprise identifying a second user profile associated with the decrypted data. The example method may comprise obtaining location data from the second computing device. The example method may comprise computing a proximity score. The example method may comprise obtaining photographic data from the second computing device. The example method may comprise computing a likelihood score. The example method may comprise computing a fraud score. The example method may comprise enabling communication between the second computing device and the first computing device.

20 Claims, 8 Drawing Sheets

(56) References Cited

U.S. PATENT DOCUMENTS

| | | | |
|---|---|---|---|
| 9,792,612 | B2 | 10/2017 | Dugan et al. |
| 10,108,382 | B2 | 10/2018 | Mihira |
| 10,149,233 | B2 | 12/2018 | Kimura |
| 10,348,415 | B2 | 7/2019 | Amancherla et al. |
| 10,372,386 | B2 | 8/2019 | Hosoda |
| 2005/0239405 | A1 | 10/2005 | Myyry et al. |
| 2007/0136202 | A1 | 6/2007 | Noma et al. |
| 2013/0195090 | A1 | 8/2013 | Hiramatsu |
| 2014/0031074 | A1 | 1/2014 | Sato et al. |
| 2014/0045472 | A1 | 2/2014 | Sharma et al. |
| 2014/0367461 | A1 | 12/2014 | Raina |
| 2015/0141005 | A1 | 5/2015 | Suryavanshi et al. |
| 2015/0178721 | A1 | 6/2015 | Pandiarajan et al. |
| 2015/0215747 | A1 | 7/2015 | Kemmerer, Jr. et al. |
| 2016/0127291 | A1 | 5/2016 | Kassab et al. |
| 2016/0330628 | A1 | 11/2016 | Kakutani |
| 2017/0013461 | A1 | 1/2017 | Yamaki |
| 2019/0147309 | A1 | 5/2019 | Hirano |
| 2019/0215878 | A1 | 7/2019 | Goto |

FOREIGN PATENT DOCUMENTS

| | | | | |
|---|---|---|---|---|
| EP | 2824954 B1 | 7/2017 | | |
| EP | 2692125 B1 | 6/2019 | | |
| GB | 2549198 A | 10/2017 | | |
| JP | 2017028461 A | 2/2017 | | |
| WO | 2016129209 A1 | 8/2016 | | |
| WO | 2016129210 A1 | 8/2016 | | |
| WO | WO-2018022708 A1 * | 2/2018 | ............. | G06F 19/00 |
| WO | 2018198036 A1 | 11/2018 | | |
| WO | WO-2020226671 A1 * | 11/2020 | ............. | G06Q 10/02 |

\* cited by examiner

PROXIMITY-BASED COMMUNICATION SYSTEMS AND METHODS

BACKGROUND

Field of the Art

This disclosure relates to systems and methods for communicating based on a proximity to an object.

Discussion of the State of the Art

Traditionally, when a first person (a sender) wishes to initiate a communication, such as a call, text, etc., with a second person (a receiver), the sender needs addressing information, such as a phone number, associated with the receiver. However, in some instances a sender may want to initiate a communication with a particular receiver when the sender does not know the receiving user's addressing information. For example, a sender may hit a parked car and wish to initiate a communication with the owner of the car. As another example, a sender may find a lost dog and wish to initiate a communication with the owner of the dog. As another example, a sender may wish to initiate a communication with an occupant of a structure. In these scenarios, and many others where the receiving user's contact information is unknown, there is no established means for initiating electronic communication without obtaining or identifying some information associated with the receiving user.

SUMMARY

Disclosed herein are systems and methods for enabling communications between devices. An example method may comprise a computer-implemented method for enabling communication between two unpaired computing devices. The example method may comprise receiving, from a second computing device, an incoming communication request to connect to a first computing device that is associated with a first point of communication code and a first user profile. The first point of communication code may be associated with an expected location data and expected photographic data. The request may be encrypted. The example method may comprise decrypting the received request associated with the incoming communication. The example method may comprise identifying a second user profile associated with the decrypted data. The example method may comprise obtaining location data from the second computing device, the location data indicating a current location associated with the second computing device. The example method may comprise computing a proximity score based on the obtained location data and the expected location data that is associated with the first point of communication code. The proximity score may identify the distance between the obtained location data and the expected location data. The example method may comprise obtaining photographic data from the second computing device, the photographic data comprising a plurality of pixels, location metadata, device metadata, and time and date metadata. The example method may comprise computing a likelihood score by applying computer vision analysis to the obtained pixel data and pixel data within expected photographic data. The likelihood score may identify the likelihood that the obtained photographic data is similar to the expected photographic data. The example method may comprise computing a fraud score based on the obtained photographic data. The fraud score may identify the likelihood that the second computing device is associated with the obtained location data by processing location metadata, device metadata, and time and date metadata. The example method may comprise enabling communication between the second computing device and the first computing device that is associated with the first user profile and the first point of communication code. The communication may be enabled when the proximity score, the likelihood score, and the fraud score each meet a threshold.

At least one of the first user profile and the second user profile may comprise one or more of a user name, a user profile picture, a phone number, and an email address.

The location data may comprise Global Positioning System (GPS) data.

The expected location data may comprise predetermined GPS data associated with the first point of communication code.

The expected location data may comprise GPS data associated with a user device associated with the first user profile.

The expected photographic data may comprise a picture of a location associated with the first user profile.

The picture of the location associated with the first user profile may have been taken during a particular time of year.

Enabling communication between the second computing device and the first computing device may comprise one or more of initiating a phone call between the second computing device and the first computing device, initiating a video call between the second computing device and the first computing device, initiating a Short Message Service (SMS) message on the second computing device addressed to the first computing device, initiating a Multimedia Messaging Service (MMS) message on the second computing device addressed to the first computing device, initiating an email message addressed to an account associated with the first user profile, and initiating a social media message addressed to an account associated with the first user profile.

The example method may comprise generating the first user profile. The example method may comprise encrypting data associated with close proximity communication. The example method may comprise associating the first user profile with the encrypted data. The example method may comprise generating a Uniform Resource Locator (URL) associated with the first user profile.

The close proximity communication may comprise one or more of Quick Response (QR) code, radio-frequency identification (RFID) tag data, Near-Field Communication (NFC) tag data, and Bluetooth Low Energy (BLE) tag data.

The example method may comprise generating a first uniform resource locator (URL) to present to the second computing device. The example method may comprise sending the first URL to the second computing device.

The example method may comprise receiving an indication of engagement with the first URL at the second computing device.

The example method may comprise requesting location data from the second computing device in response to the received indication.

The location data may be obtained after an indication is received that the second computing device has engaged with the first URL.

The example method may comprise, if a location match is determined to exist, requesting photographic data.

Computing the fraud score may comprise at least in part comparing the location metadata with at least one of the obtained location data and the expected location data.

Computing the fraud score may comprise at least in part comparing the device metadata with devices associated with the second user profile.

Computing the fraud score may comprise at least in part comparing the time and date metadata with a current time and date.

Disclosed herein are systems and methods for enabling communications between devices. An example system may comprise a communication system. The communication system may be configured to receive, from a second computing device, an incoming communication request to connect to a first computing device that is associated with a first point of communication code and a first user profile. The first point of communication code may be associated with an expected location data and expected photographic data. The request may be encrypted. The communication system may be configured to decrypt the received request associated with the incoming communication. The communication system may be configured to identify a second user profile associated with the decrypted data. The communication system may be configured to obtain location data from the second computing device, the location data indicating a current location associated with the second computing device. The communication system may be configured to compute a proximity score based on the obtained location data and the expected location data that is associated with the first point of communication code. The proximity score may identify the distance between the obtained location data and the expected location data. The communication system may be configured to obtain photographic data from the second computing device, the photographic data comprising a plurality of pixels, location metadata, device metadata, and time and date metadata. The communication system may be configured to compute a likelihood score by applying computer vision analysis to the obtained pixel data and pixel data within expected photographic data. The likelihood score may identify the likelihood that the obtained photographic data is similar to the expected photographic data. The communication system may be configured to compute a fraud score based on the obtained photographic data. The fraud score may identify the likelihood that the second computing device is associated with the obtained location data by processing location metadata, device metadata, and time and date metadata. The communication system may be configured to enable communication between the second computing device and the first computing device that is associated with the first user profile and the first point of communication code. The communication may be enabled when the proximity score, the likelihood score, and the fraud score each meet a threshold.

Disclosed herein are non-transitory computer readable media for enabling communications between devices. An example non-transitory computer readable medium may comprise instructions executable by a processor. When executed, the instructions may cause the processor to receive, from a second computing device, an incoming communication request to connect to a first computing device that is associated with a first point of communication code and a first user profile. The first point of communication code may be associated with an expected location data and expected photographic data. The request may be encrypted. When executed, the instructions may cause the processor to decrypt the received request associated with the incoming communication. When executed, the instructions may cause the processor to identify a second user profile associated with the decrypted data. When executed, the instructions may cause the processor to obtain location data from the second computing device, the location data indicating a current location associated with the second computing device. When executed, the instructions may cause the processor to compute a proximity score based on the obtained location data and the expected location data that is associated with the first point of communication code. The proximity score may identify the distance between the obtained location data and the expected location data. When executed, the instructions may cause the processor to obtain photographic data from the second computing device, the photographic data comprising a plurality of pixels, location metadata, device metadata, and time and date metadata. When executed, the instructions may cause the processor to compute a likelihood score by applying computer vision analysis to the obtained pixel data and pixel data within expected photographic data. The likelihood score may identify the likelihood that the obtained photographic data is similar to the expected photographic data. When executed, the instructions may cause the processor to compute a fraud score based on the obtained photographic data. The fraud score may identify the likelihood that the second computing device is associated with the obtained location data by processing location metadata, device metadata, and time and date metadata. When executed, the instructions may cause the processor to enable communication between the second computing device and the first computing device that is associated with the first user profile and the first point of communication code. The communication may be enabled when the proximity score, the likelihood score, and the fraud score each meet a threshold.

The present invention utilizes a system and method for proximity-based communication. An example method comprises generating a user profile. The example method comprises encrypting data associated with close proximity communication. Close proximity communication may comprise a Quick Response (QR) code, a radio-frequency identification (RFID) tag, a Near-Field Communication (NFC) tag, a Bluetooth Low Energy (BLE) tag, the like, and/or any combination of the foregoing. The example method comprises associating the user profile with the encrypted data associated with close proximity communication. The example method comprises generating a Uniform Resource Locator (URL).

The present invention utilizes a system and method for proximity-based communication. An example method comprises decrypting data associated with an incoming communication. The example method comprises matching the decrypted data to a user profile. The example method comprises providing a URL to a user device associated with the incoming communication. The example method comprises requesting location data. The example method comprises determining if a location match exists. If a location match does not exist, the example method comprises terminating communication. If a location match exists, the example method comprises requesting photographic data. The example method comprises determining if a photo match exists. If a photo match does not exist, the example method comprises terminating communication. If a photo match exists, the example method comprises determining if a photo metadata match exists. If a photo metadata match does not exist, the example method comprises terminating communication. If a photo metadata match exists, the example method comprises enabling communication.

One benefit of the present invention is that anonymous communication with a particular user may be initiated, allowing identifying information to be concealed from unwanted callers.

Another benefit of the present invention is that proximity to an object may be ensured prior to initiating of a communication with a user associated with the object, reducing a risk of unwanted communication.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
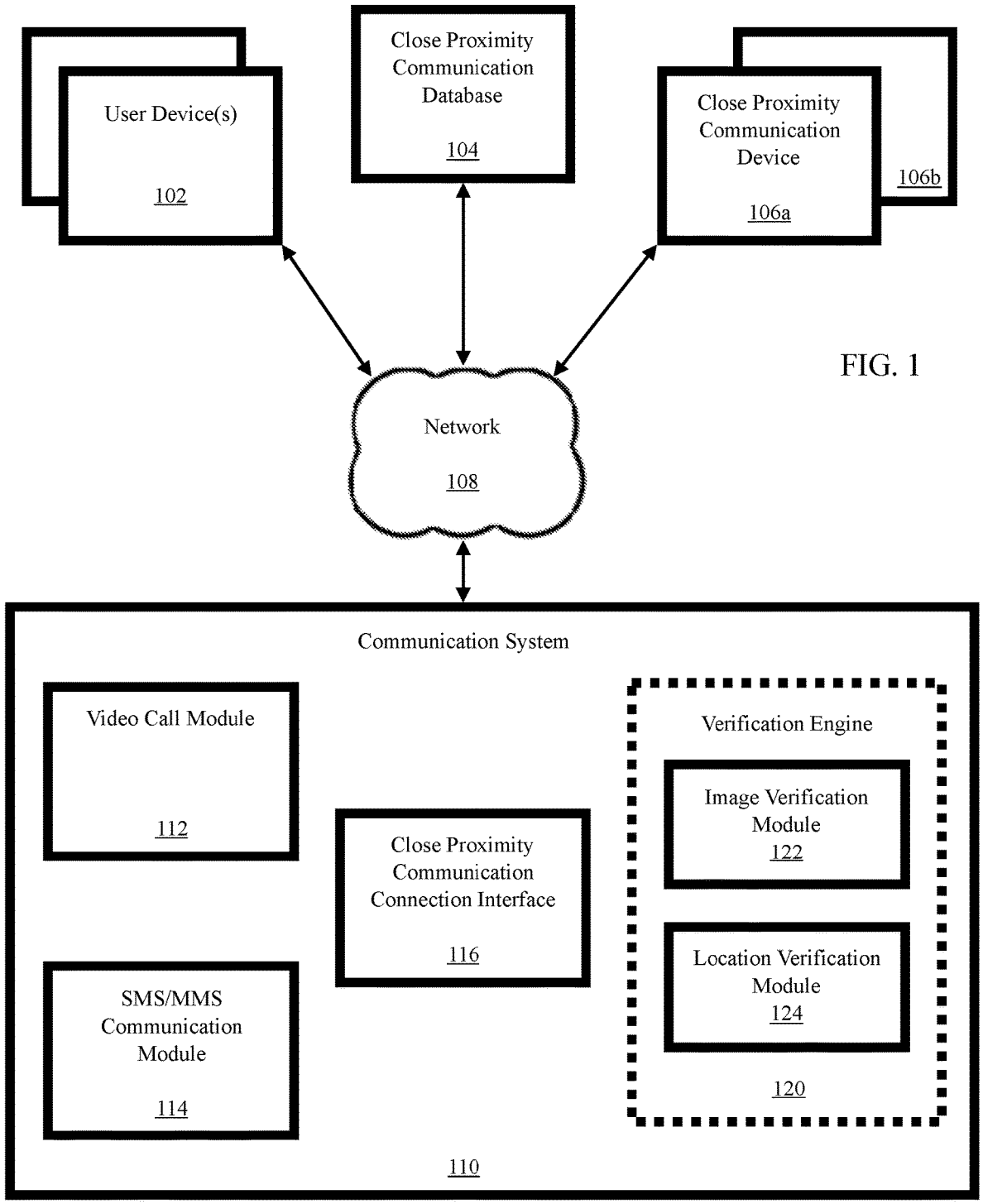
FIG. 1 illustrates a block diagram of an example operating environment of an exemplary embodiment of the invention.

A first user may create a user profile associated with a service. One or more computing devices associated with the service may receive and/or create data for close proximity communication, such as a Quick Response (QR) code. The one or more computing devices may encrypt data associated with the QR code. The one or more computing devices may associate the QR code with the user profile. The one or more computing devices may generate a Uniform Resource Locator (URL) associated with the user profile. The first user may receive a sticker with the encrypted QR code from the service. The first user may apply the sticker to a first car associated with the first user. Alternatively, the first user may apply the sticker to a dog collar associated with the first user, a front door of a house associated with the first user, etc.

A second user may drive a second car into the first car. The first car may be parked and vacant. The second user may wish to inform the first user, whose identity is unknown to the second user, of the situation. The second user may use a user device, such as a smart phone, to take a photograph of the QR code on the sticker. The user device may transmit the photograph of the QR code and/or the encrypted data associated with the QR code in a transmission to the one or more computing devices.

The one or more computing devices may receive the transmission from the user device. The one or more computing devices may extract the encrypted data associated with the QR code from the transmission. The one or more computing devices may decrypt the encrypted data associated with the QR code. The one or more computing devices may match the decrypted data with the user profile associated with the first user. The one or more computing devices may provide the URL associated with the user profile to the user device. The one or more computing devices may request location data from the user device. The one or more computing devices may receive location data, such as Global Positioning System (GPS) data, from the user device. The one or more computing devices may determine if the received location data matches approved location data. Approved location data may comprise predetermined location data, such as location data associated with a home associated with the first user, location data associated with a work address associated with the first user, etc. Approved location data may comprise real-time and/or near real-time location data, such as GPS data. If the received location data does not match the approved location data, then the one or more computing devices may terminate communication initiation. If the received location data matches the approved location data, then the one or more computing devices may transmit a request for photographic data to the user device.

The user device may receive a transmission. The transmission may prompt the user to take one or more pictures of a surrounding area. The user device may capture one or more pictures of the surrounding area. The user device may transmit the one or more pictures to the one or more computing devices.

The one or more computing devices may receive the one or more pictures from the user device. The one or more received pictures may be compared with one or more expected pictures to determine a match. If no match is determined between the one or more received pictures and the one or more expected pictures, then the one or more computing devices may terminate communication initiation. If a match is determined between the one or more received pictures and the one or more expected pictures, then the one or more computing devices may extract metadata from the one or more pictures. The one or more computing devices may compare the extracted metadata with expected results. For example, the extracted metadata may comprise a time and date and may be compared with an expected time and date, such as, for example, any time within the preceding 10 minutes. If no match is determined between the extracted metadata and the expected results (e.g., the metadata indicates the one or more pictures were taken more than 10 minutes ago), then the one or more computing devices may terminate communication initiation. If a match is determined between the extracted metadata and the expected results (e.g., the metadata indicates the one or more pictures were taken 10 minutes ago or less), then the one or more computing devices may initiate communication between the user device and a user device associated with the first user.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Conceptual Architecture

FIG. 1 illustrates a block diagram of an example operating environment of an exemplary embodiment of the invention. The operating environment may comprise a user device 102, a close proximity communication database 104, one or more close proximity communication devices 106a,b, a network 108, and a communication system 110. The communication system 110 is described in greater detail in FIG. 2 below, however, generally, the communication system 110 may allow for proximity-based communications. As illustrated in FIG. 1, the communications system 110 may comprise a video call module 112, a Short Message Service (SMS) and/or Multimedia Messaging Service (MMS) communication module 114, a close proximity communication connection interface 116, and a verification engine 120. The verification engine 120 may comprise an image verification module 122 and a location verification module 124.

The user input device 102 (herein referred to as user input device, user device, or client device) include, generally, a computer or computing device including functionality for communicating (e.g., remotely) over a network 108. The user device 102 may be used to make a profile. The user device 102 may be used to capture and/or communicate with one or more of the one or more close proximity communication devices 106a,b. The user device 102 may communicate with the communications system 110. The user device 102 may be a server, a desktop computer, a laptop computer, personal digital assistant (PDA), an in- or out-of-car navigation system, a smart phone or other cellular or mobile phone, or mobile gaming device, among other suitable computing devices. The user device 102 may execute one or more client applications, such as a web browser (e.g., Microsoft Windows Internet Explorer, Mozilla Firefox, Apple Safari, Google Chrome, and Opera, etc.), or a dedicated application to submit user data, or to make prediction queries over the network 108.

In particular embodiments, each user device 102 may be an electronic device including hardware, software, or embedded logic components or a combination of two or more such components and capable of carrying out the appropriate functions implemented or supported by the user device 102. For example and without limitation, a user device 102 may be a desktop computer system, a notebook computer system, a netbook computer system, a handheld electronic device, or a mobile telephone. The present disclosure contemplates any user device 102. A user device 102 may enable a network user at the user device 102 to access network 108. A user device 102 may enable its user to communicate with other users at other user devices 102.

A user device 102 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 102 one or more Hyper Text Markup Language (HTML) files responsive to the HTTP request. The user device 102 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 102 may also include an application that is loaded onto the user device 102. The application may obtain data from the network 108 and displays it to the user within an application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

The close proximity communication database 104 may comprise close proximity communication information. The close proximity communication database 104 may associate close proximity communication information with a user profile. The close proximity communication information may comprise Quick Response (QR) code information. The close proximity communication information may comprise a radio-frequency identification (RFID) information. The close proximity communication information may comprise Near-Field Communication (NFC) information. The close proximity communication information may comprise Bluetooth Low Energy (BLE) information.

The one or more close proximity communication devices 106a,b may comprise objects and/or devices that comprise close proximity communication information. The one or more close proximity communication devices 106a,b may be and/or comprise a first point of communication code. The one or more close proximity communication devices 106a,b may comprise a sticker with a Quick Response (QR) code. The one or more close proximity communication devices 106a,b may comprise a radio-frequency identification (RFID) tag and/or transmitter. The one or more close proximity communication devices 106a,b may comprise a Near-Field Communication (NFC) tag and/or transmitter. The one or more close proximity communication devices 106a,b may comprise a Bluetooth Low Energy (BLE) tag and/or transmitter.

The network 108 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art) communicate. In particular embodiments, the network 108 is an intranet, an extranet, a virtual private network (VPN), a local area network (LAN), a wireless LAN (WLAN), a wide area network (WAN), a metropolitan area network (MAN), a portion of the Internet, or another network or a combination of two or more such networks. One or more links connect the systems and databases described herein to the network 108. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 108, and any suitable link for connecting the various systems and databases described herein.

The network 108 connects the various systems and computing devices described or referenced herein. In particular embodiments, network 108 is an intranet, an extranet, a virtual private network (VPN), a local area network (LAN), a wireless LAN (WLAN), a wide area network (WAN), a metropolitan area network (MAN), a portion of the Internet, or another network or a combination of two or more such networks. The present disclosure contemplates any suitable network 108.

One or more links couple one or more systems, engines or devices to the network 108. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 108.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various clients devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Communication System

Figure 2:
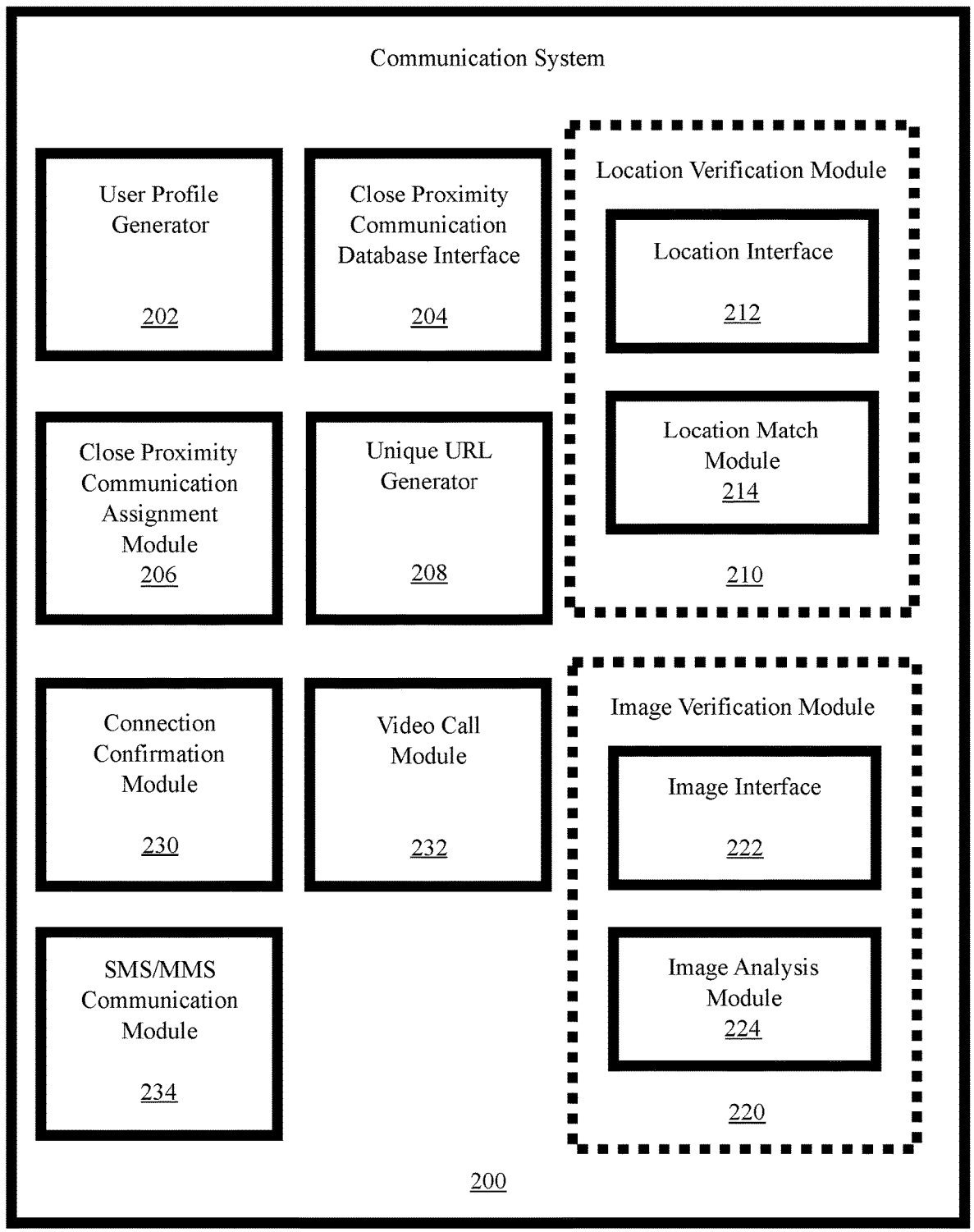
FIG. 2 illustrates a block diagram of a communication system in accordance with an embodiment of the invention.

FIG. 2 illustrates an exemplary embodiment of the communication system 200. The communication system 200 may comprise the communication system 110 in FIG. 1. The communication system 200 may comprise a user profile generator 202, a close proximity communication database interface 204, a close proximity communication assignment module 206, a unique Uniform Resource Locator (URL) generator 208, a location verification module 210, an image verification module 220, a connection confirmation module 230, a video call module 232, and a Short Message Service (SMS) and/or Multimedia Messaging Service (MMS) communication module 234. The location verification module 210 may comprise a location interface 212 and a location match module 214. The image verification module 220 may comprise an image interface 222 and an image analysis module 224.

The user profile generator 202 may receive a request to generate a user profile from a user device associated with a user. The user device may execute an application. The application may cause the user device to communicate with the user profile generator 202 via a network. In response to the request, the user profile generator 202 may generate a user profile for the user. The user may make updates to the user profile via the user device. The changes may be reflected in the data stored in the close proximity communication database 104 in FIG. 1. The user profile may comprise a user name, a user profile picture, a phone number, an email address, etc.

The close proximity communication database interface 204 may interface with the close proximity communication database 104 in FIG. 1. The close proximity communication database interface 204 may transmit a user profile to the close proximity communication database 104. The close proximity communication database interface 204 may transmit close proximity communication information to the close proximity communication database 104. The close proximity communication database interface 204 may receive a user profile from the close proximity communication database 104. The close proximity communication database interface 204 may receive close proximity communication information from the close proximity communication database 104. Close proximity communication information may comprise Quick Response (QR) code information. Close proximity communication information may comprise radio-frequency identification (RFID) information. Close proximity communication information may comprise Near-Field Communication (NFC) information. Close proximity communication information may comprise Bluetooth Low Energy (BLE) information.

The close proximity communication assignment module 206 may assign close proximity communication information to a user profile. The close proximity communication assignment module 206 may assign close proximity communication information received via the close proximity communication database interface 204 to a user profile generated by the user profile generator 202. The close proximity communication information may be and/or comprise a first point of communication code. Close proximity communication information may comprise Quick Response (QR) code information. Close proximity communication information may comprise radio-frequency identification (RFID) information. Close proximity communication information may comprise Near-Field Communication (NFC) information. Close proximity communication information may comprise Bluetooth Low Energy (BLE) information.

The URL generator 208 may generate a URL associated with the user profile. When the URL is loaded into a browser, a page associated with the user profile may be presented. The page may allow a second user to initiate a communication with the user associated with the user profile.

The location interface 212 may receive (e.g., obtain, retrieve, etc.) location information (e.g., data, etc.). Location information may comprise Global Positioning System (GPS) data. The location interface 212 may receive location information from a network and prepare the received location information to be usable by the location match module 214. The location match module 214 may compare the location information with expected location information. Expected location information may comprise predetermined GPS data, such as GPS data associated with the user associated with the user profile, such as a home associated with the user, a workplace associated with the user, etc. Expected location information may be received in real-time and/or near real-time. Expected location information may be based on an accelerometer and GPS data. For example, for a close proximity communication object (such as a sticker comprising a QR code) affixed to an automobile, an accelerometer associated with a driver's user device and/or the automobile may determine when the automobile is parked, and in response to parking, a GPS device associated with the driver's user device and/or the automobile may generate GPS data that is transmitted to the communication system 200 as expected location information. Expected location information may be based on an expected location of a first point of communication code.

The location match module 214 may compute a proximity score based on the received location information and the expected location information. The proximity score may identify the distance between the obtained location data and the expected location data.

The image interface 222 may receive (e.g., obtain, retrieve, etc.) image (e.g., photographic, picture, etc.) information (e.g., data, etc.) from a requester's user device. The image information may comprise one or more images. The image information may comprise video. The image interface 222 may receive image information from a network and prepare the received image information to be usable by the image analysis module 224. The image analysis module 224 may compare received image information to expected image information. Expected image information may comprise one or more image and/or video files associated with a location associated with the user profile. Expected image information may comprise one or more image and/or video files associated with a location associated with the user profile associated with a particular time of year (e.g., particular season, particular month, particular day of the year, etc.). Comparing the received image information to expected image information may comprise determining if a location associated with the received image information matches a location associated with the expected image information.

The received image information may comprise a plurality of pixels, location metadata, device metadata, and time and date metadata. The image analysis module 224 may compute a likelihood score by applying computer vision to the received plurality of pixels to pixels associated with expected image information. The likelihood score may identify the likelihood that the received image information is similar to expected image information. The image analysis module 224 may compute a fraud score based on the received image information. The fraud score may identify the likelihood that the requester's user device is associated with the obtained location data by processing one or more of the location metadata, the device metadata, and the time and date metadata.

Comparing the received image information to expected image information may comprise comparing metadata to expected metadata. For example, the metadata may comprise a time and date when image information was created and may be compared with an expected time and date, such as, for example, any time within the preceding 10 minutes. The image analysis module 224 may determine if the received image information was created within the expected time and date. As another example, the metadata may comprise a source of the image information and the expected image information may comprise an indication that a source is an application associated with the communication system 200. The image analysis module 224 may determine if the received image information was taken from within the application or, for example, uploaded from a gallery.

The connection confirmation module 230 may facilitate a communication connection between a user device associated with a sender and a user device associated with a user profile associated with an incoming message. The connection confirmation module 230 may ensure that a communication connection between a user device associated with a sender and a user device associated with a user profile associated with an incoming message is appropriate. The connection confirmation module 230 may terminate initiation of a communication connection between a user device associated with a sender and a user device associated with a user profile associated with an incoming message if such a communication is deemed inappropriate.

The video call module 232 may facilitate an audio and/or video communication connection between a user device associated with a sender and a user device associated with a user profile associated with an incoming message. The video call module 232 may cause a route to be established between a user device associated with a sender and a user device associated with a user profile associated with an incoming message, in which audio and/or video communications may be transmitted.

The Short Message Service (SMS) and/or Multimedia Messaging Service (MMS) communication module 234 may facilitate SMS and/or MMS communication between a user device associated with a sender and a user device associated with a user profile associated with an incoming message. The video call module 232 may cause SMS and/or MMS messages from a user device associated with a sender to be delivered to storage accessible by a user device associated with a user profile associated with an incoming message. The video call module 232 may cause SMS and/or MMS messages from a user device associated with a user profile associated with an incoming message to be delivered to storage accessible by a user device associated with a sender.

Processes for Establishing Proximity-Based Communications

Figure 3A:
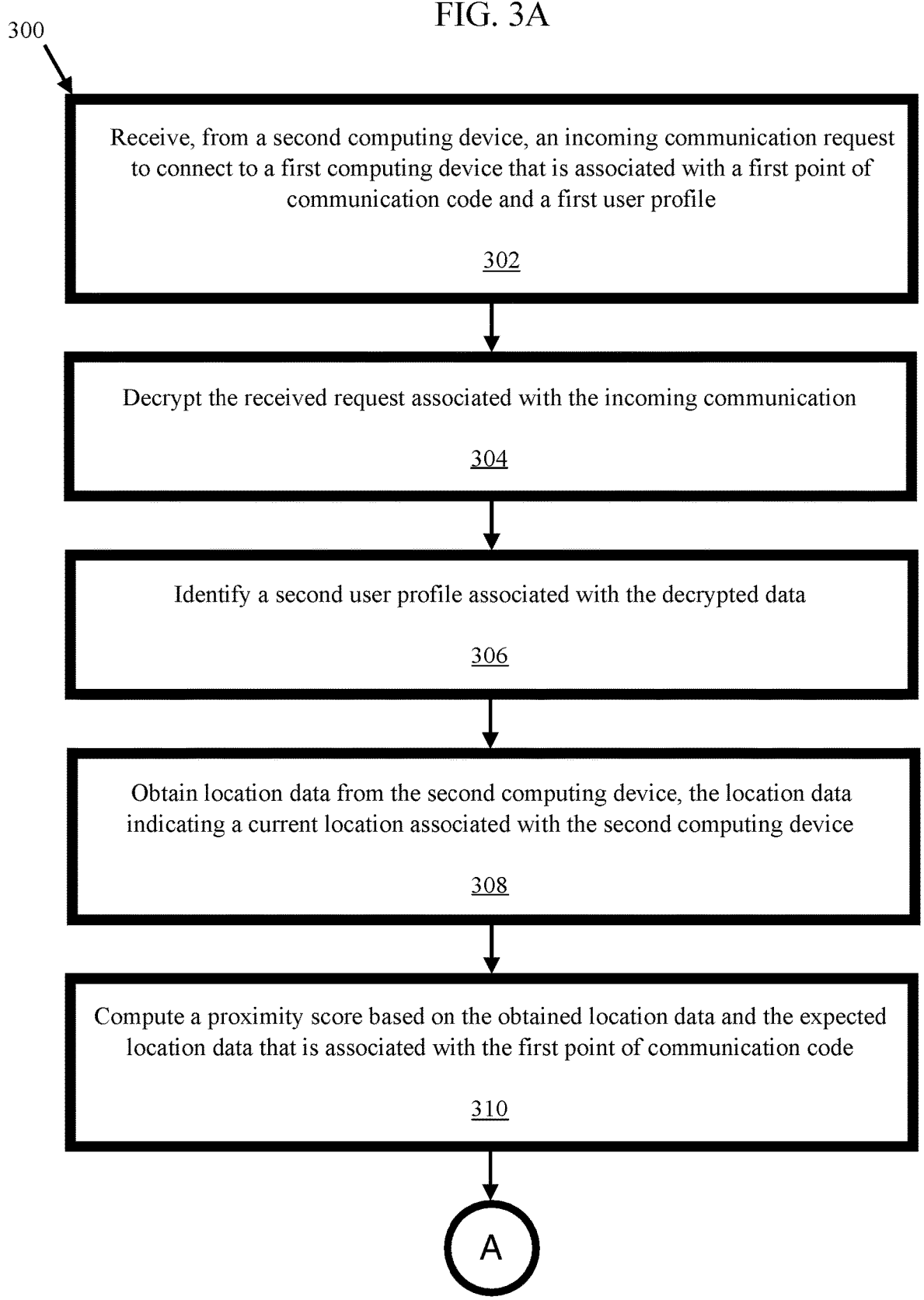
FIGS. 3A-3B illustrate a flowchart for establishing proximity-based communications in accordance with an exemplary embodiment of the present invention.
Figure 3B:
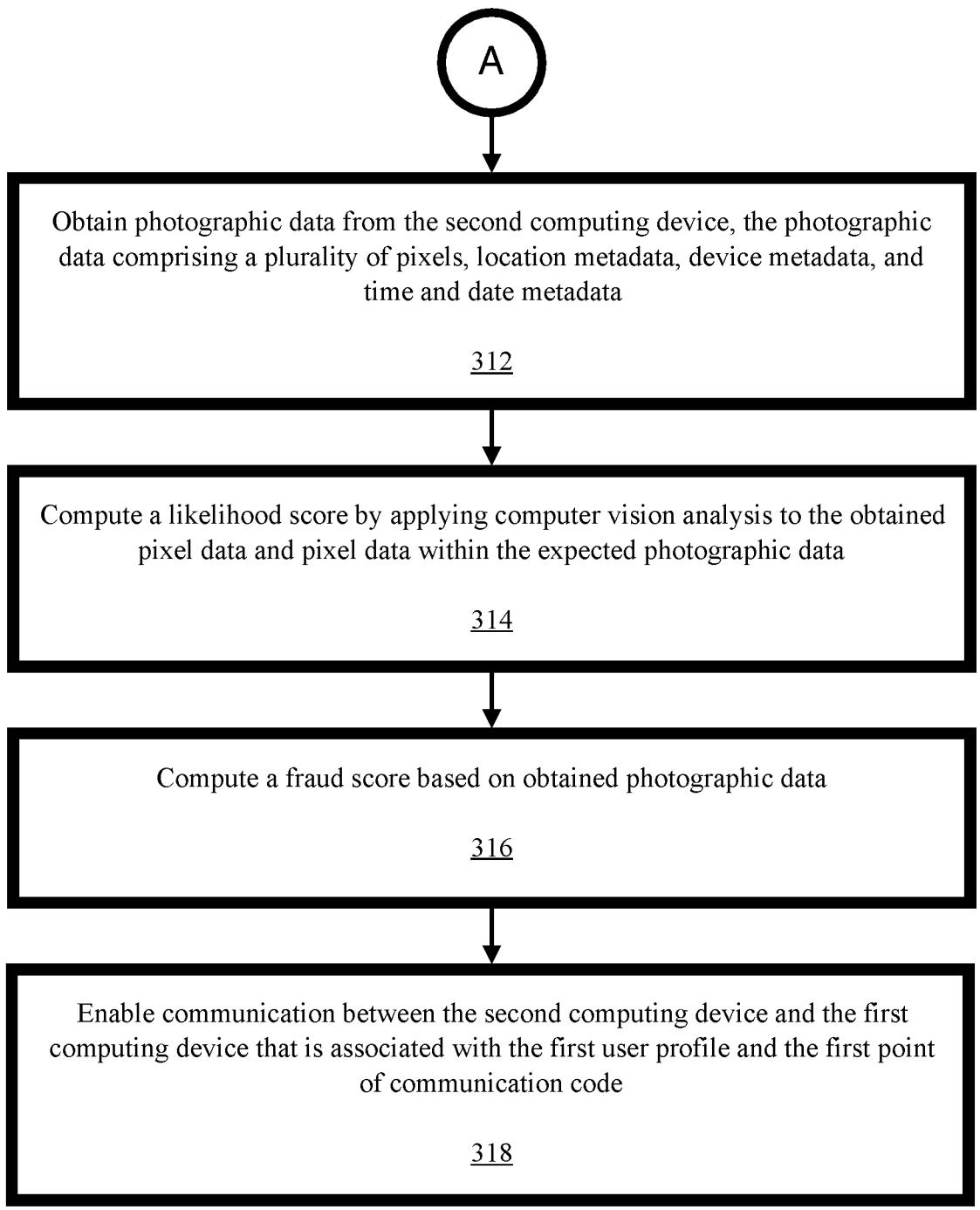

FIG. 3 illustrates, in an example embodiment, method 300 of establishing proximity-based communications. In embodiments, the method steps or techniques depicted and described herein can be performed in a processor of the communication system 200 in FIG. 1, the method steps being encoded as processor-executable instructions in a non-transitory memory of the communication system 200. The techniques of FIG. 3 may be implemented in an operating system kernel, in a separate user process, in a library package bound into network applications, on a specially constructed machine, on an application-specific integrated circuit (ASIC), or a field programmable gate array (FPGA).

At step 302, an incoming communication request to connect to a first computing device that is associated with a first point of communication code and a first user profile may be received from a second device. The first point of communication code may be associated with an expected location data and expected photographic data. The request may be encrypted. The first user profile may comprise one or more of a user name, a user profile picture, a phone number, and an email address.

At step 304, the received request associated with the incoming communication may be decrypted. The incoming communication may be associated with close proximity communication.

At step 306, a second user profile associated with the decrypted data may be identified. The second user profile may comprise one or more of a user name, a user profile picture, a phone number, and an email address.

At step 308, location data may be obtained from the second computing device. The location data may indicate a current location associated with the second computing device. The location data may comprise Global Positioning System (GPS) data. The expected location data may comprise predetermined GPS data associated with the first point of communication code. The expected location data may comprise GPS data associated with a user device associated with the first user profile.

At step 310, a proximity score may be computed based on the obtained location data and the expected location data that is associated with the first point of communication code. The proximity score may identify the distance between the obtained location data and the expected location data.

At step 312, photographic data may be obtained from the second computing device. The photographic data may comprise a plurality of pixels, location metadata, device metadata, and time and date metadata.

At step 314, a likelihood score may be computed by applying computer vision analysis to the obtained pixel data and pixel data within expected photographic data. The likelihood score may identify the likelihood that the obtained photographic data is similar to the expected photographic data. The expected photographic data may comprise a picture of a location associated with the first user profile. The picture of the location associated with the first user profile may have been taken during a particular time of year. For example, if the current season is winter, the expected photographic data may comprise a picture of a location associated with the first user profile that was taken during winter. As another example, if the current month is September, the expected photographic data may comprise a picture of a location associated with the first user profile that was taken during September. As another example, if the current date is December, 4th, the expected photographic data may comprise a picture of a location associated with the first user profile that was taken on a December 4th. The picture of the location associated with the first user profile may have been taken during a particular time of day. For example, if it is currently morning, the expected photographic data may comprise a picture of a location associated with the first user profile that was taken during a morning.

At step 316, a fraud score may be computed based on the obtained photographic data. The fraud score may identify the likelihood that the second computing device is associated with the obtained location data by processing location metadata, device metadata, and time and date metadata.

At step 318, communication may be enabled between the second computing device and the first computing device that is associated with the first user profile and the first point of communication code. The communication may be enabled when the proximity score, the likelihood score, and the fraud score each meet a threshold. Enabling communication between the second computing device and the first computing device may comprise one or more of initiating a phone call between the second computing device and the first computing device, initiating a video call between the second computing device and the first computing device, initiating a Short Message Service (SMS) message on the second computing device addressed to the first computing device, initiating a Multimedia Messaging Service (MMS) message on the second computing device addressed to the first computing device, initiating an email message addressed to an account associated with the first user profile, and initiating a social media message addressed to an account associated with the first user profile.

In one embodiment, the process may enable communication based on image recognition only. For example, a user of a second computing device may take a picture of a house or a dog, etc. and the system may perform an image recognition analysis to see if the received image matches an associated image in the database. If it does, then the process may continue as outlined above to enable communication. Any image recognition and matching software that is known to a person of ordinary skill in the art, may be used, without departing from the scope of the invention.

The first user profile may be generated. Data associated with close proximity communication may be encrypted. The first user profile may be associated with the encrypted data. A Uniform Resource Locator (URL) associated with the first user profile may be generated. The close proximity communication may comprise one or more of Quick Response (QR) code, radio-frequency identification (RFID) tag data, Near-Field Communication (NFC) tag data, and Bluetooth Low Energy (BLE) tag data.

A first uniform resource locator (URL) may be generated to present to the second computing device. The first URL may be sent to the second computing device. An indication of engagement with the first URL may be received at the second computing device. Location data may be requested from the second computing device in response to the received indication. The location data may be obtained after an indication is received that the second computing device has engaged with the first URL.

Optionally, if a location match is determined to exist, photographic data may be requested. A location match may be determined to exist if the proximity score achieves a threshold value.

Computing the fraud score may comprise at least in part comparing the location metadata with at least one of the obtained location data and the expected location data. Computing the fraud score may comprise at least in part comparing the device metadata with devices associated with the second user profile. Computing the fraud score may comprise at least in part comparing the time and date metadata with a current time and date.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 4:
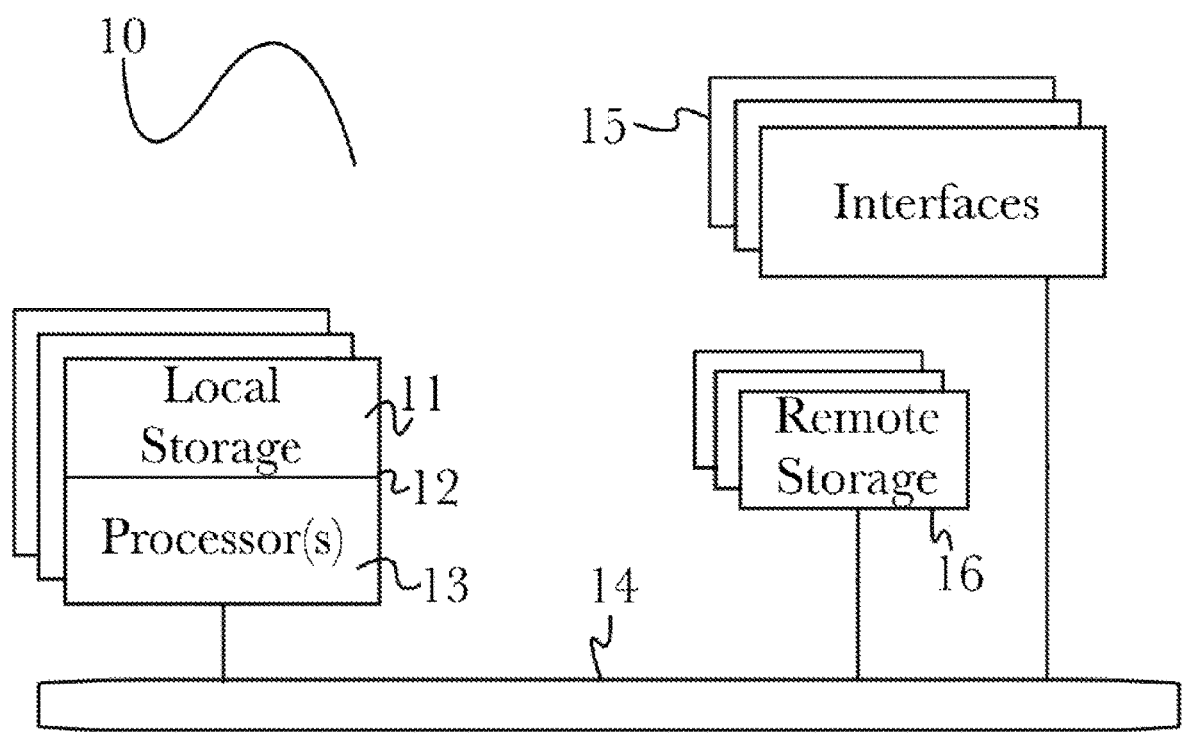
FIG. 4 illustrates an exemplary computing device that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

The computing device 10 may be and/or comprise the communications system 200.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
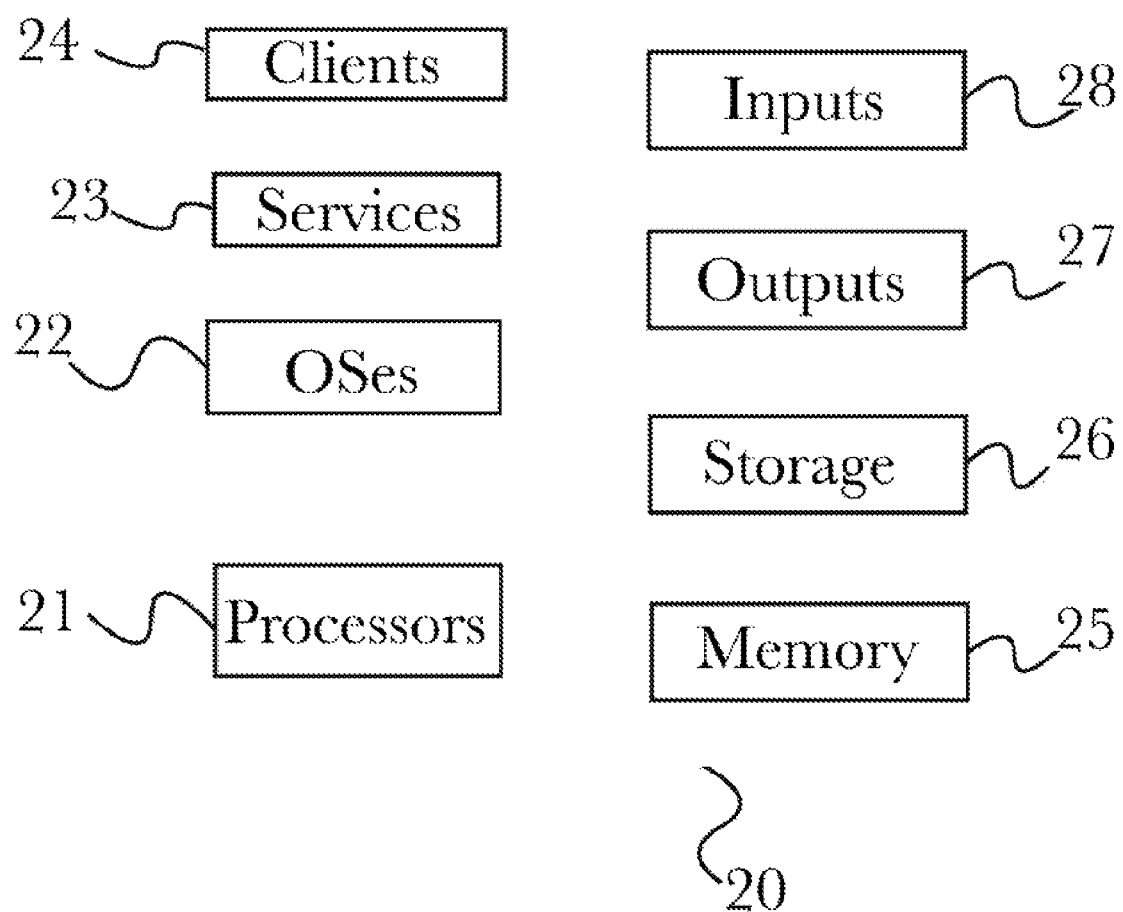
FIG. 5 illustrates an exemplary standalone computing system that supports an embodiment of the inventive disclosure.

In some embodiments, systems may be implemented on a standalone computing system. Referring now to FIG. 5 above, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

The system 20 may be and/or comprise the communication system 200.

Figure 6:
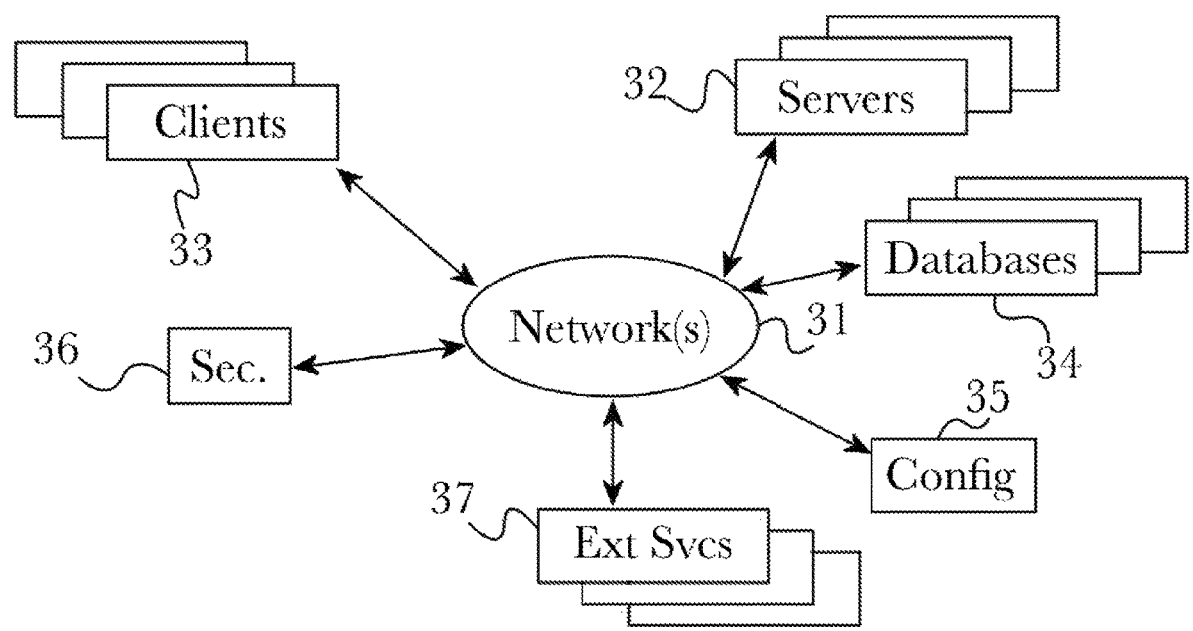
FIG. 6 illustrates on embodiment of the computing architecture that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

The one or more of the server(s) 32 may be and/or comprise the communication system 200.

Figure 7:
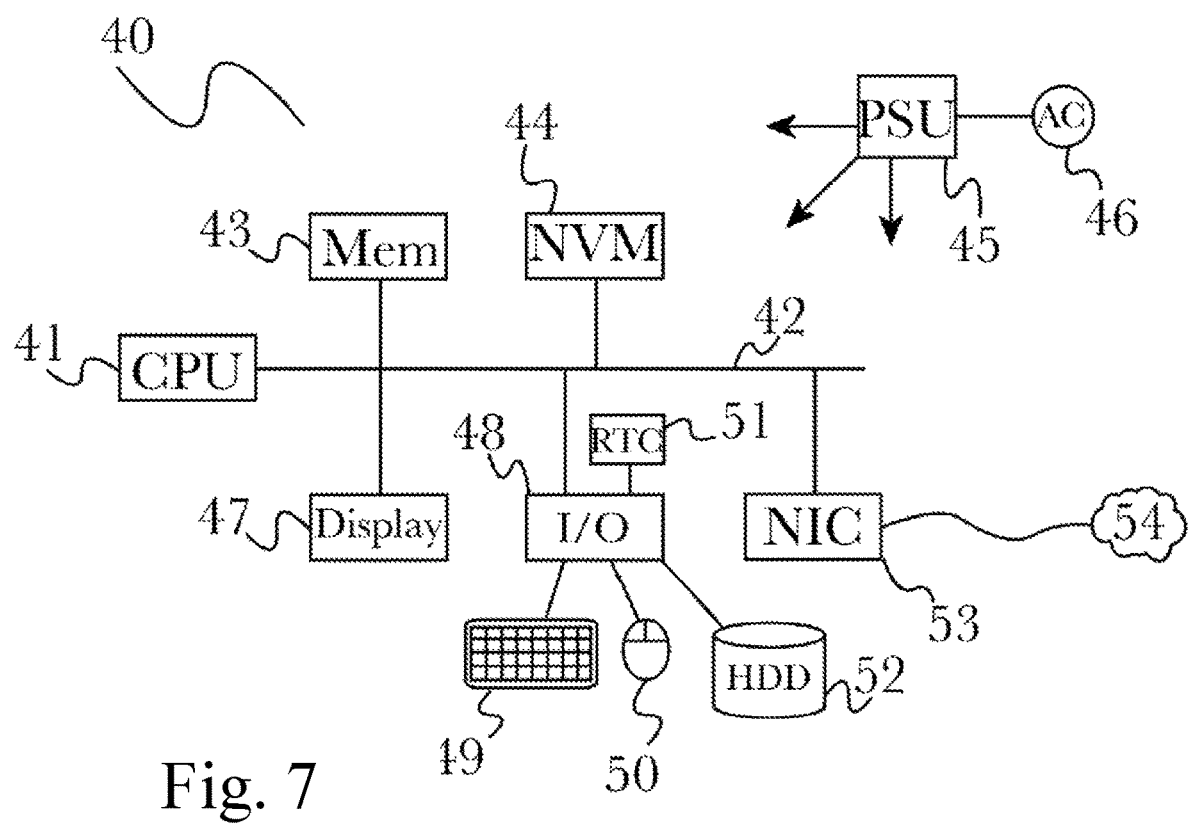
FIG. 7 illustrates an exemplary overview of a computer system that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

The computer system 40 may be and/or comprise the communication system 200.

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for communicating based on a proximity to an object through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer-implemented method for enabling communication between two unpaired computing devices, the computer-implemented method comprising:
   receiving, from a second computing device, an incoming communication request to connect to a first computing device that is associated with a first point of communication code and a first user profile, wherein the first point of communication code is associated with an expected location data and expected photographic data, further wherein the request is encrypted;
   decrypting the received request associated with the incoming communication;
   identifying a second user profile associated with the decrypted data;
   obtaining location data from the second computing device, the location data indicating a current location associated with the second computing device;
   computing a proximity score based on the obtained location data and the expected location data that is associated with the first point of communication code, wherein the proximity score identifies the distance between the obtained location data and the expected location data;
   obtaining photographic data from the second computing device, the photographic data comprising a plurality of pixels, location metadata, device metadata, and time and date metadata;
   computing a likelihood score by applying computer vision analysis to the obtained pixel data and pixel data within expected photographic data, wherein the likelihood score identifies the likelihood that the obtained photographic data is similar to the expected photographic data;
   computing a fraud score based on the obtained photographic data, wherein the fraud score identifies the likelihood that the second computing device is associated with the obtained location data by processing location metadata, device metadata, and time and date metadata; and
   enabling communication between the second computing device and the first computing device that is associated with the first user profile and the first point of communication code, wherein the communication is enabled when the proximity score, the likelihood score, and the fraud score each meet a threshold.

2. The method of claim 1, wherein at least one of the first user profile and the second user profile comprises one or more of a user name, a user profile picture, a phone number, and an email address.

3. The method of claim 1, wherein the location data comprises Global Positioning System (GPS) data.

4. The method of claim 3, wherein the expected location data comprises predetermined GPS data associated with the first point of communication code.

5. The method of claim 3, wherein the expected location data comprises GPS data associated with a user device associated with the first user profile.

6. The method of claim 1, wherein the expected photographic data comprises a picture of a location associated with the first user profile.

7. The method of claim 6, wherein the picture of the location associated with the first user profile was taken during a particular time of year.

8. The method of claim 1, wherein enabling communication between the second computing device and the first computing device comprises one or more of initiating a phone call between the second computing device and the first computing device, initiating a video call between the second computing device and the first computing device, initiating a Short Message Service (SMS) message on the second computing device addressed to the first computing device, initiating a Multimedia Messaging Service (MMS) message on the second computing device addressed to the first computing device, initiating an email message addressed to an account associated with the first user profile, and initiating a social media message addressed to an account associated with the first user profile.

9. The method of claim 1, further comprising:
generating the first user profile;
encrypting data associated with close proximity communication;
associating the first user profile with the encrypted data; and
generating a Uniform Resource Locator (URL) associated with the first user profile.

10. The method of claim 9, wherein the close proximity communication comprises one or more of Quick Response (QR) code, radio-frequency identification (RFID) tag data, Near-Field Communication (NFC) tag data, and Bluetooth Low Energy (BLE) tag data.

11. The method of claim 1, further comprising:
generating a first uniform resource locator (URL) to present to the second computing device; and
sending the first URL to the second computing device.

12. The method of claim 11, further comprising receiving an indication of engagement with the first URL at the second computing device.

13. The method of claim 12, further comprising requesting location data from the second computing device in response to the received indication.

14. The method of claim 13, wherein the location data is obtained after an indication is received that the second computing device has engaged with the first URL.

15. The method of claim 1, further comprising, if a location match is determined to exist, requesting photographic data.

16. The method of claim 1, wherein computing the fraud score comprises at least in part comparing the location metadata with at least one of the obtained location data and the expected location data.

17. The method of claim 1, wherein computing the fraud score comprises at least in part comparing the device metadata with devices associated with the second user profile.

18. The method of claim 1, wherein computing the fraud score comprises at least in part comparing the time and date metadata with a current time and date.

19. A system comprising:
a communication system, wherein the communication system is configured to:
receive, from a second computing device, an incoming communication request to connect to a first computing device that is associated with a first point of communication code and a first user profile, wherein the first point of communication code is associated with an expected location data and expected photographic data, further wherein the request is encrypted;
decrypt the received request associated with the incoming communication;
identify a second user profile associated with the decrypted data;
obtain location data from the second computing device, the location data indicating a current location associated with the second computing device;
compute a proximity score based on the obtained location data and the expected location data that is associated with the first point of communication code, wherein the proximity score identifies the distance between the obtained location data and the expected location data;
obtain photographic data from the second computing device, the photographic data comprising a plurality of pixels, location metadata, device metadata, and time and date metadata;
compute a likelihood score by applying computer vision analysis to the obtained pixel data and pixel data within expected photographic data, wherein the likelihood score identifies the likelihood that the obtained photographic data is similar to the expected photographic data;
compute a fraud score based on the obtained photographic data, wherein the fraud score identifies the likelihood that the second computing device is associated with the obtained location data by processing location metadata, device metadata, and time and date metadata; and
enable communication between the second computing device and the first computing device that is associated with the first user profile and the first point of communication code, wherein the communication is enabled when the proximity score, the likelihood score, and the fraud score each meet a threshold.

20. A non-transitory computer readable medium comprising instructions executable by a processor, wherein, when executed, the instructions cause the processor to:
receive, from a second computing device, an incoming communication request to connect to a first computing device that is associated with a first point of communication code and a first user profile, wherein the first point of communication code is associated with an expected location data and expected photographic data, further wherein the request is encrypted;
decrypt the received request associated with the incoming communication;
identify a second user profile associated with the decrypted data;

obtain location data from the second computing device, the location data indicating a current location associated with the second computing device;
compute a proximity score based on the obtained location data and the expected location data that is associated with the first point of communication code, wherein the proximity score identifies the distance between the obtained location data and the expected location data;
obtain photographic data from the second computing device, the photographic data comprising a plurality of pixels, location metadata, device metadata, and time and date metadata;
compute a likelihood score by applying computer vision analysis to the obtained pixel data and pixel data within expected photographic data, wherein the likelihood score identifies the likelihood that the obtained photographic data is similar to the expected photographic data;
compute a fraud score based on the obtained photographic data, wherein the fraud score identifies the likelihood that the second computing device is associated with the obtained location data by processing location metadata, device metadata, and time and date metadata; and
enable communication between the second computing device and the first computing device that is associated with the first user profile and the first point of communication code, wherein the communication is enabled when the proximity score, the likelihood score, and the fraud score each meet a threshold.

\* \* \* \* \*